US006883782B2

(12) United States Patent
Ames et al.

(10) Patent No.: US 6,883,782 B2
(45) Date of Patent: Apr. 26, 2005

(54) CABLE CLAMPING APPARATUS AND METHOD

(75) Inventors: William Mathew Ames, Carmichael, CA (US); Jeremy Daniel Wheaton, La Crescenta, CA (US)

(73) Assignee: BendyCo Incorporated, LaCrescenta, CA (US)

( * ) Notice: Subject to any disclaimer, the term of this patent is extended or adjusted under 35 U.S.C. 154(b) by 33 days.

(21) Appl. No.: 10/405,083

(22) Filed: Apr. 2, 2003

(65) Prior Publication Data

US 2004/0041136 A1 Mar. 4, 2004

Related U.S. Application Data

(60) Provisional application No. 60/407,559, filed on Aug. 30, 2002.

(51) Int. Cl.[7] .................................................. B66F 3/00
(52) U.S. Cl. ........................ 254/134.3 FT; 254/134.3 R
(58) Field of Search ........................ 254/134, 134.3 FT, 254/134.3 R, 134.6

(56) References Cited

U.S. PATENT DOCUMENTS

| | | | |
|---|---|---|---|
| 524,035 A | 8/1894 | White | |
| 2,231,919 A | 2/1941 | Kent | |
| 3,727,967 A | 4/1973 | Anastasiu et al. | 294/86.31 |
| 3,906,619 A | 9/1975 | Shaffer | 29/517 |
| 4,368,910 A | 1/1983 | Fidrych | 294/86 |
| 4,453,291 A | 6/1984 | Fidrych | 24/115 |
| 4,736,978 A | 4/1988 | Cielker | 294/90 |
| 5,245,730 A | 9/1993 | Martin | 24/132 |
| 5,283,930 A * | 2/1994 | Krauss | 24/129 R |
| 5,513,555 A * | 5/1996 | Plank et al. | 92/19 |
| 5,868,060 A * | 2/1999 | Plank et al. | 92/19 |
| 6,471,268 B1 | 10/2002 | Stenstrom et al. | 294/15 |
| 2004/0041136 A1 * | 3/2004 | Ames et al. | 254/134.3 FT |

* cited by examiner

Primary Examiner—Lee D Wilson
(74) Attorney, Agent, or Firm—Baker & Hostetler LLP

(57) ABSTRACT

A device and method for clamping and pulling an elongated item such as a wire or cable through a path such as in a conduit for a main body with a bore, and inwardly directed pivoting teeth. The teeth are arranged in circular bands. The end of the item is gripped after insertion of the item, and is cut off and ejected when the pulling is completed.

21 Claims, 7 Drawing Sheets

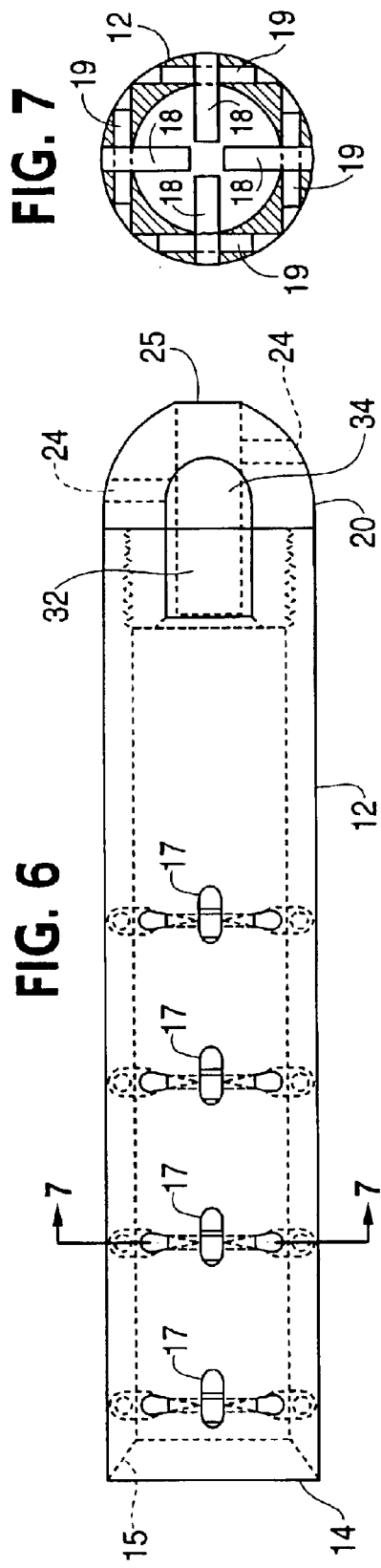

CABLE CLAMPING APPARATUS AND METHOD

PRIORITY

This application claims priority to the provisional patent application Ser. No. 60/407,559 filed Aug. 30, 2002, entitled "Snagger", the disclosure of which is hereby incorporated by reference.

FIELD OF THE INVENTION

The invention relates to the field of releasably clamping and pulling elongated items such as, for example, wires and cables. More particularly, the apparatus relates to an apparatus and method for releasably clamping the end of an elongated item such as a wire or cable for the purpose of pulling the wire or cable through a path such as, for example, a path defined by a conduit.

BACKGROUND OF THE INVENTION

There are many circumstances in which it is desirable to releasably grasp the end of an elongated item so that it can be pulled along a path, such as, for example, through a length of conduit. In the electrical and telecommunication industries, for example, it is common for one or more cables or wires to be pulled through a conduit that will provide a path for the wires. These circumstances arrive particularly in the case of copper power and telecommunication wires, but they also occur with fiber optic cables, or any other type of cable or wire. The wires or cables are typically run through a path formed by a conduit that provides to the wire or cable structural protection as well as protection from environmental factors such as moisture. The conduits can include, for example, typical metal or plastic type conduits which run throughout buildings. Other examples include metal or plastic conduits that run in building foundations and underground, overhead conduits, and even various conduits found inside vehicles such as aircraft. Conduits may also run overhead through power poles or up and down the length of power poles.

Depending on the circumstances, one or even a large number of wires or cables, referred to hereinafter as "lines" may be ultimately run through a conduit. For example, in the case of telephone lines, up to three to five hundred pairs of lines may be found resulting in one cable that is one inch in diameter. The range of conduits found in industry is quite wide, and includes, by way of example only, typical conduits from 2 inches up to 6 inches. Wires ranging for example from number 6 copper to 750 mcm copper are often found. In some cases, the copper wire will be a twisted copper wire having a relatively thin insulation surrounding the copper which itself is surrounded by ABS plastic sheathing. Aluminum wires may have a similar two layer insulation and sheathing.

Since splicing the ends of wires together can be difficult and time consuming, in telecommunications it is typically desirable to run the longest single length of line possible at a time. In many circumstances the length of line, or "run" is typically made anywhere in the range from 20 feet to 1800 feet. Also, the typical distance between junction boxes in a conduit system is 150–300 feet, so runs of at least this length are very common.

One circumstance that frequently occurs is the need to pull four electrical lines all at the same time, comprising three or four electrical lines depending on the electrical configuration, and one typically smaller ground line. These four electrical lines are often required to be pulled through a steel conduit in the form of a pipe in a building or a PVC plastic pipe underground.

In some instances when performing such a pull, the distance of the pull can become quite significant, and the force of the pull can be on the order of 500–700 pounds per line, resulting in a total pull stress of 2,000–3,000 pounds. Thus, it is desirable for a clamping system which clamps onto the end of the line being pulled to be able to accommodate the necessary force for the application.

One approach to gripping the end of a cable for a pull has been a type of clamp which uses a body that receives the end of the wire and holds it between two opposed but offset set screws. A clamp of this type is used on each wire separately where multiple wires are pulled at once. A disadvantage of this system is that the time required for insertion of the wire and proper tightening of the set screws in order to achieve satisfactory pulling can be relatively long. Moreover, if an operator does not spend sufficient time with the set screw process, or is not properly trained in setting up the system, wires may tend to slip out of the system. Moreover, some form of tightening tool such as a hex wrench is required to be present both for tightening the set screws and loosening them after the pull has been completed.

Another type of cable clamping arrangement is a basket type grip having a woven mesh that tightens around the line upon pulling force in a fashion similar to a Chinese finger puzzle. When a group of cables is to be pulled, they are typically all wrapped together and pulled by a single length of mesh. In order to provide proper gripping force, this system requires the mesh to be significantly elongated in order to have sufficient frictional force. Since the gripped length of wire typically needs to be discarded, this method can lead to a greater waste of the end of the cable than the set screw apparatus. Moreover, this system requires typically even more time and attention to attach to the end of the line or lines than the set screw device described above.

Accordingly, it would be desirable to have an apparatus and method that can conveniently and securely clamp on the end of an item to be pulled through a path such as a conduit. It would also be desirable to have such a device that can provide an adequate pulling force as needed in industry. Further, it would be desirable to have such a device that can rapidly and conveniently be used without necessarily requiring an additional tool for the attachment and release steps. Further, it would be desirable for the device to be durable and reusable.

SUMMARY OF THE INVENTION

The foregoing needs are met, to at least to a great extent, by the present invention, which provides an apparatus and method for releasably clamping elongated articles such as wires or cables. In some embodiments, the invention provides an apparatus and method that can conveniently and securely clamp on the end of a line to be pulled through a path such as a conduit, and that can rapidly and conveniently be used without necessarily requiring an additional tool for the attachment and release steps.

In accordance with one aspect of the present invention, an apparatus for releasably clamping onto the end of an elongated item has a main body having a bore therethrough, and a plurality of pivoting teeth pivotedly mounted to the main body and projecting generally inward into the bore.

In accordance with another embodiment aspect of the present invention, an apparatus for releasably clamping onto the end of an elongated item, has a main body having a bore therethrough, and pivoting means for gripping the item pivotedly mounted to the main body and projecting generally inward into the bore.

In accordance with yet another aspect of the present invention, a method for pulling an elongated item through a path, includes inserting an end of the item into the bore of a body having pivoting teeth projecting generally radially inward in the bore, applying a pulling force to the item so that the pivoting teeth clamp on the item apply a resistive force in the pulling direction to pull the item, maintaining the pulling force to pull the item along the path, cutting the pulled end of the item off to form a cut end, and displacing the cut end of the item through the bore in the direction of original insertion to eject the cut end from the body.

There has thus been outlined, rather broadly, certain embodiments of the invention in order that the detailed description thereof that follows herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 6 is a side view, including hidden lines, of the cylindrical body and cap of the device assembled together.

FIG. 7 is a cross-sectional view taking through line 7—7 in FIG. 6.

DETAILED DESCRIPTION OF THE INVENTION

Figure 1:
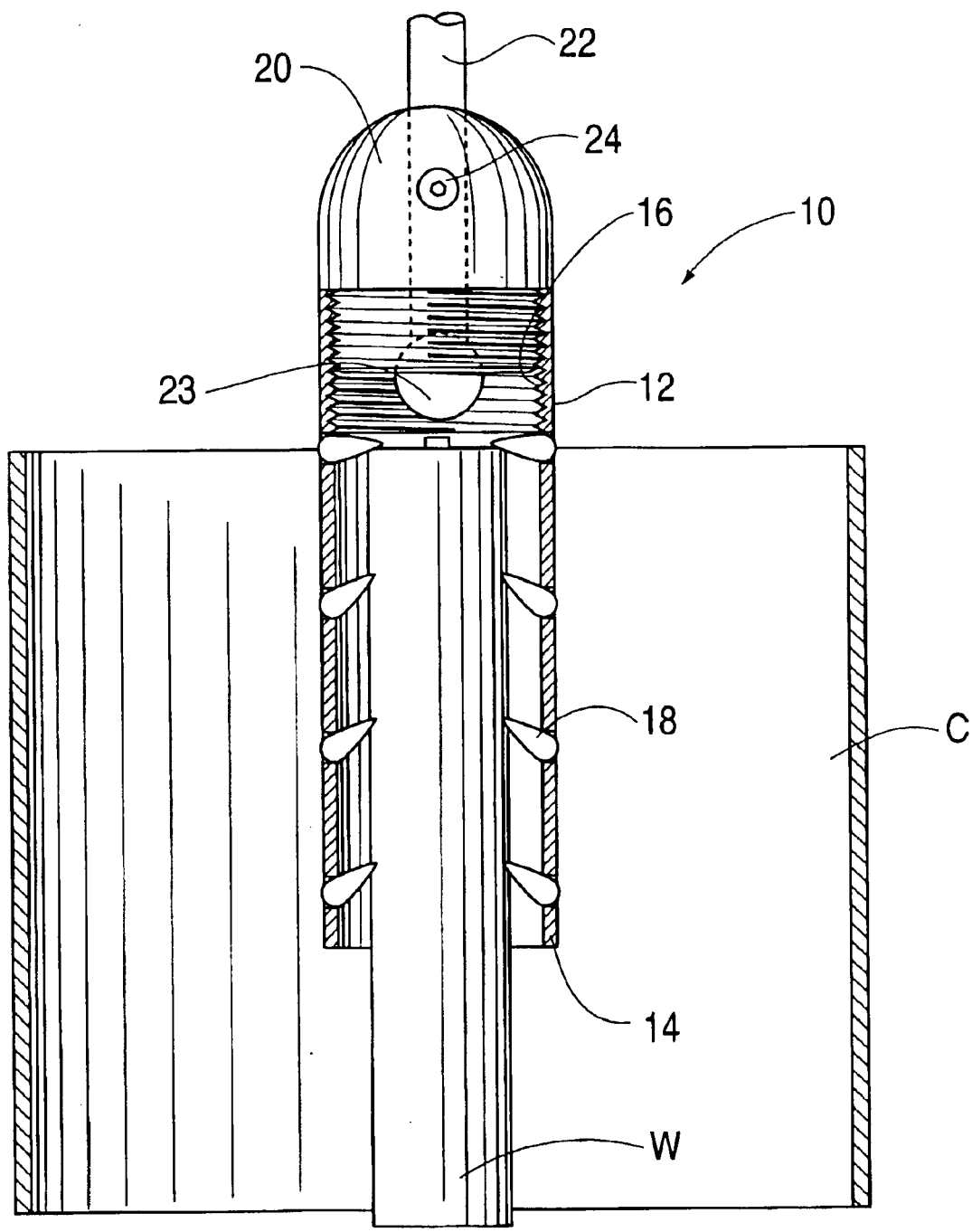
FIG. 1 is a cutaway view showing a clamp device according to a preferred embodiment of the present invention clamped onto the end of a line being pulled through a conduit.

Preferred embodiments of the present invention provide an apparatus and method for releasably clamping elongated items such as wires or cables. Some embodiments of the invention can conveniently and securely clamp on the end of a line to be pulled through a path such as a conduit, providing adequate pulling force as needed in industry. The clamping device that can rapidly and conveniently be used without necessarily requiring an additional tool for the attachment and release steps. Further, some embodiments of the device are durable and reusable. A preferred embodiment of the invention will now be described with reference to the drawing Figures, in which like reference numerals refer to like elements throughout.

Figure 3:
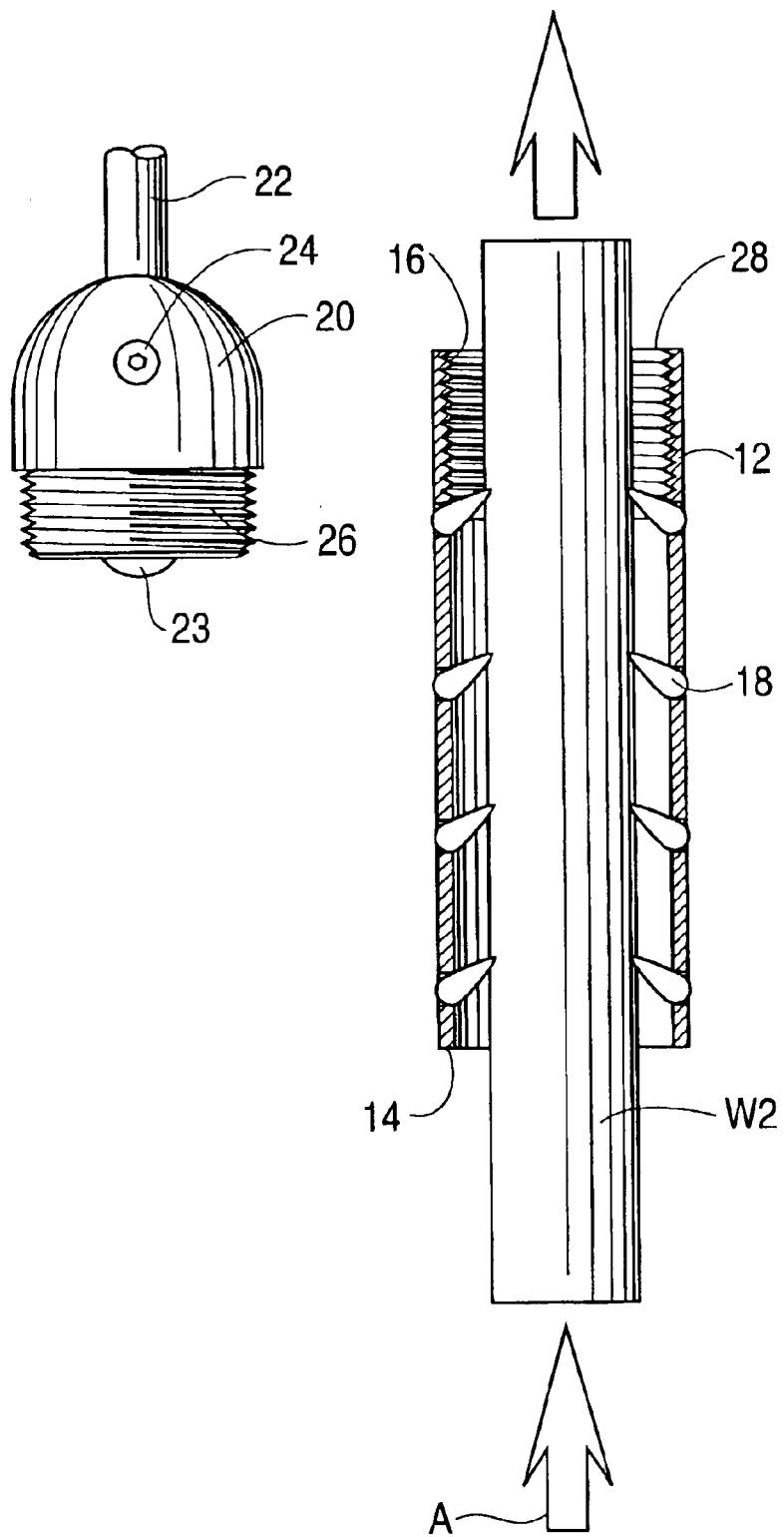
FIG. 3 is a disassembled cutaway view showing a cap portion of the clamp disassembled from a body portion so that the cut end of the line can be pushed out one end of the body of the clamp.
Figure 4:
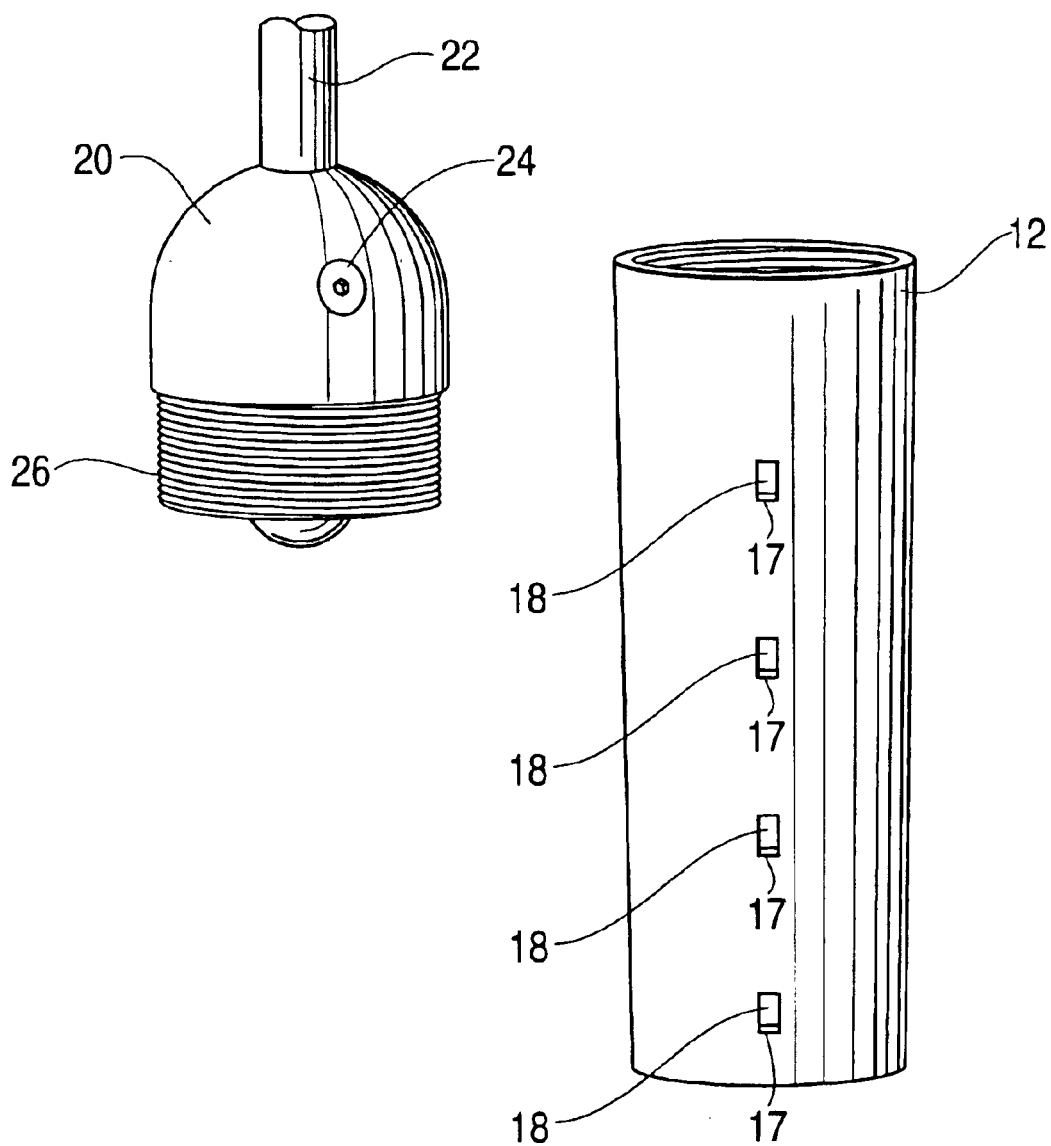
FIG. 4 is a disassembled perspective view of the cap and body of the clamp.
Figure 8:
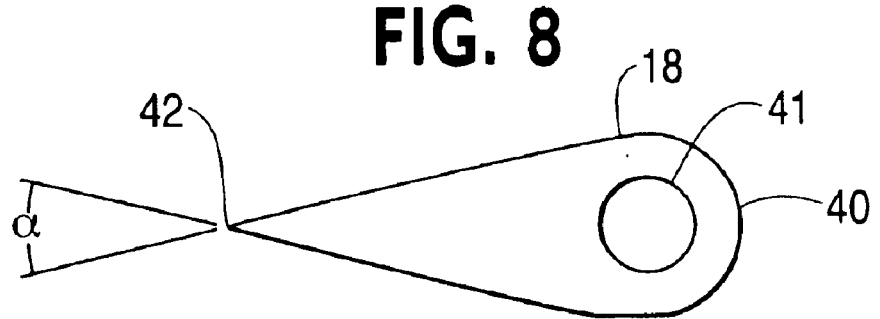
FIG. 8 is a side view of a tooth.
Figure 9:
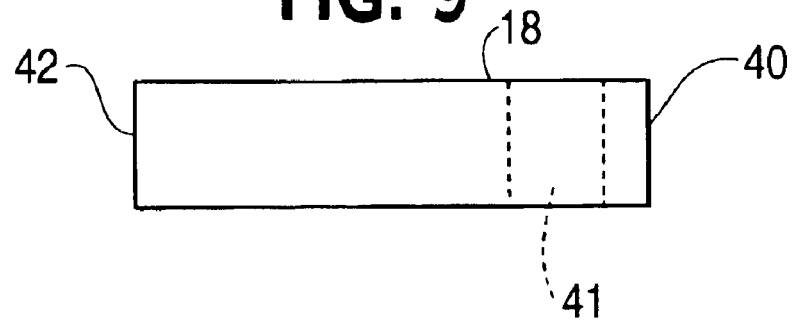
FIG. 9 is a top view of the tooth of FIG. 8.

Referring now particularly to FIGS. 1 and 3, a clamping device 10 is illustrated which has a cylinder body 12. The cylinder body 12 has a first open end 14 and a second internally threaded open end 16. Continuing with FIG. 1 but also referring to FIGS. 6 and 7, a number of pivoting teeth 18 are arranged in circumferential rings spaced from axially each other. The teeth 18 project generally inwardly from the cylinder body 12, and are mounted within slots 17 which penetrate entirely through the walls of the cylinder body 12. The pivoting teeth 18 are each retained by a pin 19 to pivot around the pin 19. Slots 17 are elongated and the rear or radially outwardmost portion of the pivoting teeth 18 move within the elongation of the slot 17 during pivoting of the respective tooth 18. The rear portion 40 of a tooth 18 is seen in FIGS. 8 and 9. The bore 41 in the tooth 18 receives the pin 19.

If the pulling device. 10 is oriented generally vertically as shown in FIG. 1, the teeth 18 will tend to fall to a downward, or radial inwardmost resting position. The teeth 18 are limited in their downward travel by the contact interference of the rear or radially outward most portion 40 of the tooth 18 with the end of the slot 17. The resting place angle is preferably approximately 15 degrees relative to the plane perpendicular to the cylinder body 12. However, it will be appreciated that the resting angle could be greater or lesser. It is generally preferred that the resting angle be selected such that insertion of wire W, as shown in FIG. 1 will cause the teeth 18 to pivot in the direction of insertion, such as upward as shown in FIG. 1.

Returning now to particularly FIG. 1, when a wire W is inserted in the open end 14 of the body 12, as it passes each row of teeth 18 it will displace the teeth 18 slightly in the direction of insertion (upward in FIG. 1) and the inward tips of the teeth 18 will ride along the outer surface of the wire W. Once the wire W has passed one or more rows of teeth 18, any force in the opposite direction to the insertion direction (downward in FIG. 1) will cause the tips of the teeth 18 to frictionally engage with the outer surface of the wire W. Frictional contact will cause the teeth 18 to tend to pivot downward and thus grip or clamp onto the wire W and resist any pulling of the wire W in this opposite direction. Further, due to the angled condition of the teeth 18 as they are gripping the wire W, pulling forces are converted into a force having an inward component which tends to cause the frictional fit to become greater as the pulling force increases.

Figure 2:
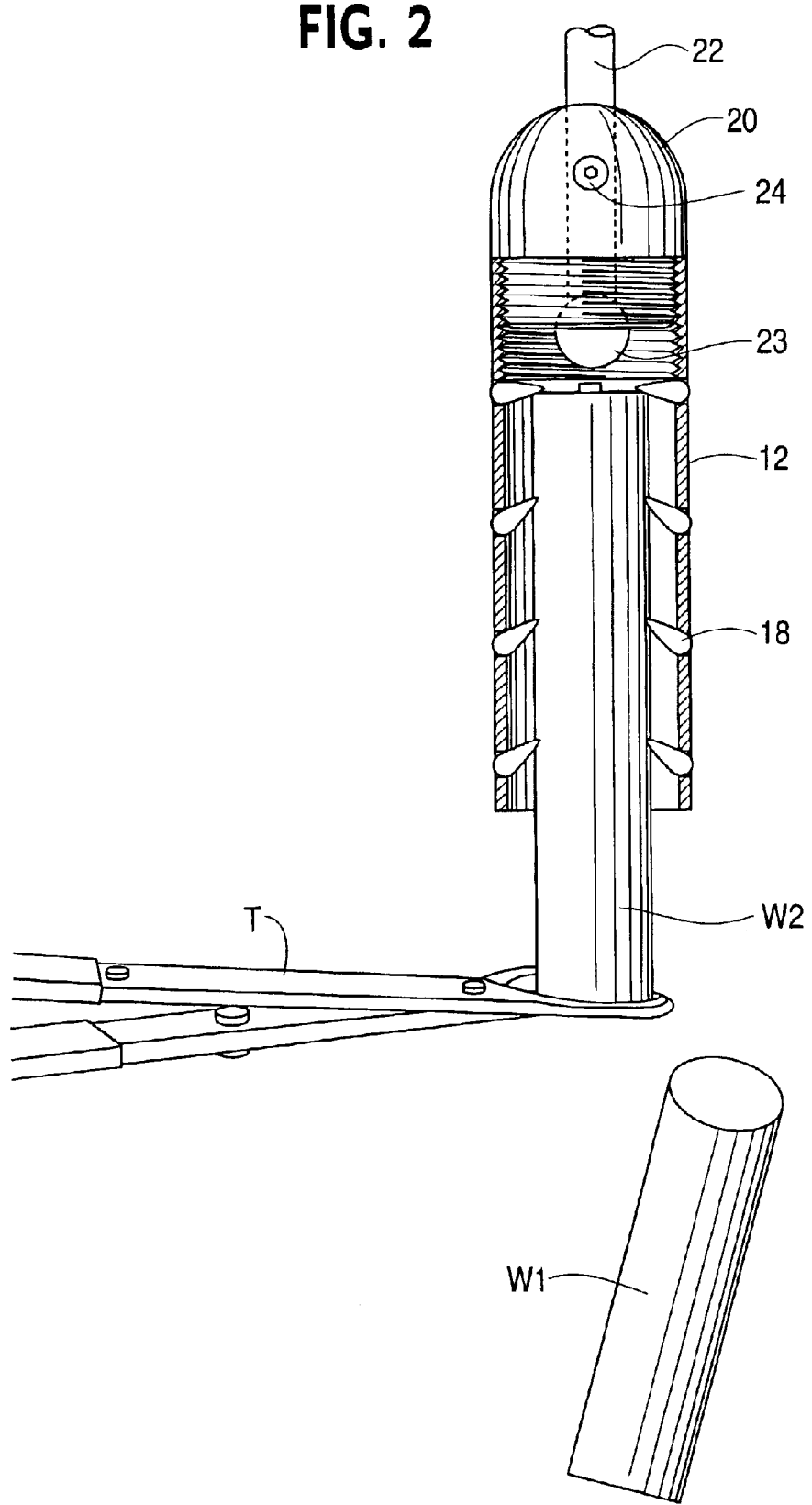
FIG. 2 is a cutaway view showing the end of the line being clamped while it is being cut off from the remainder of the line after having been pulled completely through the conduit.

Thus, it will be appreciated that the actual gripping and pulling forces are transmitted from the pivoting teeth 18 to the pins 19 and thus into the body 12. As shown by FIGS. 2, 6 and 7, resistance of the pins use of the teeth 18 to any further pivoting or release of the wire W is provided by the geometry imposed by the teeth 18 and pins 19. Thus, it is not necessary that any interference between the back end 40 of the teeth 18 (see FIGS. 8 and 9) and the edge of the slot 17 directly occur. Accordingly, although interference between the back end 40 (see FIGS. 8 and 9) of the teeth 18 and the slot 17 is used to define the resting position of the teeth, such interference is not necessarily needed for the pulling force resistance. Alternatively, the teeth 18 can be provided with a lobe that contacts the inner wall of the body 12 to resist excessive pivoting, and therefore resist pulling forces.

The teeth 18 may preferably have some degree of sharpening at their tip 42 (see FIGS. 8 and 9) so that they tend to dig to some extent into the outer surface of the wire W. FIGS. 8 and 9 illustrate a teeth 18 having the radially outwardmost portion 40 that interferes with the slot 17 to locate the resting position, and a sharp tip 42 having a tip angle and to provide grip. The sharpened tip 42 enhances the ability of the teeth 18 to provide a resistant force. However, it will be appreciated that substantial penetration or digging into the wire W in many instances will not be required, and that the tips 42 at the teeth 18 may have other suitable features and/or surface treatments for providing a frictional force against the outer surface of the wire W. Because in many instances the gripped end of the wire is simply discarded after the pull, however, any damaging effect on the wire at the location of the teeth 18 is not necessarily an undesirable result.

Returning now to FIGS. 1–4, the pulling device 10 further has a removable cap 20. The cap 20 provides connection to a wire rope 22, which may have a loop or other connector at its end distal from the cap 20. The affixing of the ball 23 to the end of the wire rope 22 can be accomplished by process as known in the art. In some instances, the wire rope 22 may be provided with a ball 23, a knob, or some other suitable gripping feature, which is larger than a bore 25 which is provided through the end of the cap 20 and through which the rope 22 passes. The wire rope 22 is further held to the cap 20 by for example, a pair of set screws 24 which may be opposed from each other and tightened and connected on to the end of the wire rope 22. The set screws are preferably allen headless type set screws. In this instance, the set screws 24 are not required to resist the pulling force, but rather if tightened will serve to prevent rotation about the longitudinal axis of the wire rope relative to the cap 20. When pulling is performed with the set screws 24 loosened, then the device 10 will be free to rotate relative to the wire rope 22, so that undesirable twisting will not be imparted to the wires being pulled. This helps avoid possible shearing of the wires. However, the set screws 24 can be tightened to prevent the axial rotation of the clamping device about its axis, when desired, for example when retrieving a single line.

The cap 20 has an externally threaded end 26 which mates with the internal threads 16 of the cylinder body 12. Turning now to FIG. 6, the sides of the cap 20, and the sides of the threaded end 16 of the body 12, may be provided with respective opposed flats to facilitate gripping of these two items by wrenches in order to tighten and loosen the cap 20 on to the cylinder body 12.

Some aspects of the method of operation of the clamping device 10 will now be described, with particular reference to FIGS. 1–4. Initially, a user begins with the device 10 configured as shown in FIG. 1 (but without any wire inserted) with the cylinder body 12 fully threaded onto the cap 20. The pulling wire rope 22 at this stage is extending out of the cap 20 and may or may not be attached to a tugging device which will provide motive force for the eventual tugging. With the pulling device arranged as in FIG. 1 (but without any wire inserted), the end of the wire W to be pulled is then inserted, preferably as far as possible, into the interior of the cylinder body 12 through the end 14. This causes the teeth 18 to pivot in the direction of the insertion into the condition shown in FIG. 1. In this condition, the pivoting teeth 18 will resist the pulling force that would tend to pull the wire W out of the device 10, and so tugging on the pulling wire rope 22 effectively pulls the wire through the conduit C. If not already so connected, the pulling wire rope is connected to a material tugger if necessary and pulling force is applied to pull the wire through the path in the conduit. FIG. 6 also illustrates the open end 14 of the cylinder body 12 having a tapered entrance, which facilitates smooth insertion of the wire W.

As shown in FIG. 2, once the pulling is complete and the wire W is now in the free space outside the other end of the conduit, the wire W can be cut generally by a tool T such as a conventional wire cutter. This will leave an end of the wire W1 in a freshly cut and substantially undamaged condition and ready for splicing or connection to another item. The cut off end W2 will tend to stay held by the pulling device 10 because of its contact with the pivoting teeth 18. To remove the cut end W2 from the pulling device 10, a preferable step is to unscrew the cap 20 off of the body 12, and then push the cut end W2 in the direction shown by the arrow A. In some instances, the unscrewing of the cap 20 may be done with hand pressure. In other instances, a tool such as a wrench may be needed and is particularly suitable where flats are provided, such as flat 32 on the cylinder body 12 and flat 34 in the cap 20 as shown in FIG. 6.

Returning to FIG. 3, the pushing on the wire end W2 in direction A may often be accomplished simply by orienting the cylinder body 12 so that the direction A downward so that the force of gravity on the wire end W2 will cause the wire end W2 to fall out. In other instances, hand pressure at the end of W2 may be required to overcome any residual frictional gripping on the wire, and in other instances pushing with a tool or similar steps may be employed to free the wire W2. Once the wire end W2 has been ejected, the pulling device 10 is in the configuration shown in FIG. 4, and is ready for the cylinder body 12 to be reattached to the cap 20 so that the clamping device 10 may be reused.

The illustrated embodiment has sixteen pivoting teeth 18, arranged in four bands of four teeth each. This number of teeth has been found preferable for certain sizes of wires and expected pull lengths and pull resisting forces. For example, this number of teeth is suitable for certain applications ranging from number 4 copper wire to 250 mcm copper wire with pulling forces up to 1,000 pounds per wire being pulled. However, it will be appreciated that different numbers of pivoting teeth, including different numbers of circular bands, and different numbers of radially spaced teeth within a band, may both be advantageously employed. The number of teeth employed around a single band preferably is even number so that pairs of teeth are directly opposed to each other, but odd numbers of teeth may also be advantageously employed.

It will be appreciated that the pivot sweep of the teeth 18 will permit a device 10 of a certain size, having a certain diameter of cylinder body 12, to accommodate at least to some degree a range of sizes of wires W to be pulled. For a given size device 10, different sizes or diameters of wires W to be pulled will involve the teeth 18 having a different gripping angle during the pulling process. The gripping angle for optimum pulling force is generally approximately 45 degrees between the axis of the tooth and the sidewall of the wire W, however, many embodiments of the invention can perform their function at angles both greater and less than a 45 degrees gripping angle.

Figure 5:
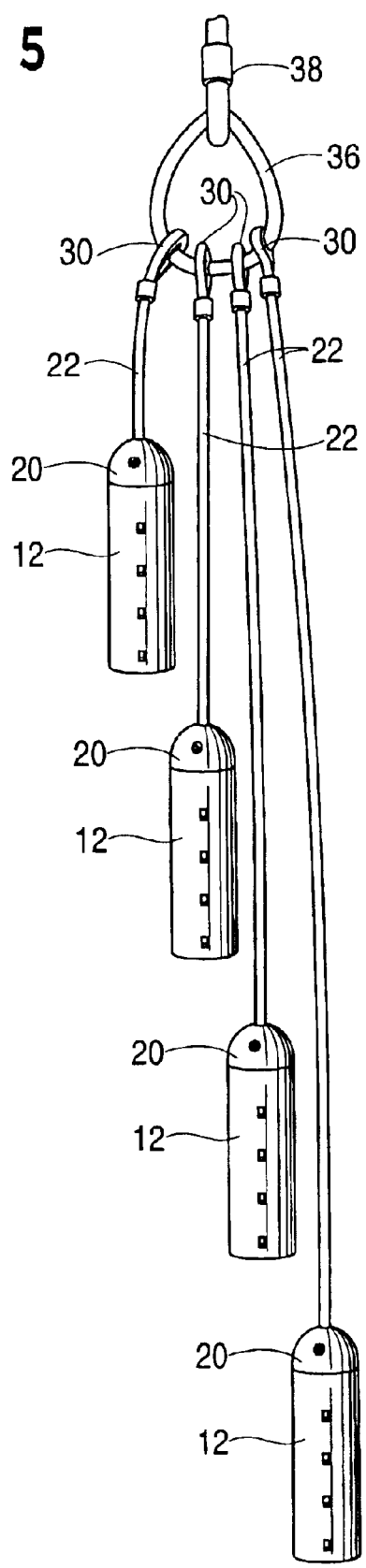
FIG. 5 is a perspective view showing four clamps according to an embodiment of the present invention attached to a common carabiner which is pulled by a tugger.

FIG. 5 illustrates an exemplary arrangement in which four clamping devices 10 are used. In the case of pulling four wires at once, the four clamping devices 10 are each connected by a respective wire rope 22 to a single loop or carabiner 36, so that all of the devices 10 are pulled at the same rate. Regardless of the number of devices 10, in the case of the electrical industry, is common for the devices to be pulled or tugged by a tugging line 38. In some cases this tugging line 34 may be attached to a power operated take-up roll by a power-operated device that can provide the pulling force necessary. FIG. 5 illustrates an example where the clamping devices 10 are staggered so that the diameter of the conduit needs to be only be somewhat larger than the diameter of one of the devices 10. Thus, the conduit need only accommodate the diameter of a single device 10 and the three other wire ropes 22 in the illustrated embodiment.

Although an example of the device is shown pulling a wire it will be appreciated that other items can be gripped. Also, although the device is useful to pull items through conduit it can also be used to pull items through other paths and/or in other industries.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for releasably clamping onto the end of an elongated item, comprising:
    a main body having a bore therethrough; and
    a plurality of pivoting teeth each pivotedly mounted to the main body by a respective hinge pin and projecting generally inward into the bore, different ones of the teeth being located at different angular locations from each other around the inner circumference of the body.

2. An apparatus according to claim 1, wherein the plurality of teeth comprises at least two teeth equally spaced in a circular band, located in a plane perpendicular to a longitudinal axis of the bore.

3. An apparatus according to claim 2, wherein the plurality of teeth comprises at least two bands of teeth, each band having two or more teeth equally spaced in the band, and each band located in a respective plane perpendicular to a longitudinal axis of the bore.

4. An apparatus according to claim 1, wherein the plurality of teeth comprises at least three teeth equally spaced in a band, located in a plane perpendicular to a longitudinal axis of the bore.

5. An apparatus according to claim 4, wherein the plurality of teeth comprises at least two bands of teeth, with each ring having at least three teeth equally spaced in the band, and each band located in respective plane perpendicular to a longitudinal axis of the bore.

6. An apparatus according to claim 1, wherein the teeth each have a sharpened tip that grip the elongated item when the item is pulled.

7. An apparatus according to claim 1, wherein the elongated item is a wire or cable.

8. An apparatus for releasably clamping onto the end of an elongated item, comprising:
    a main body having a bore therethrough; and
    a plurality of pivoting teeth pivotedly mounted to the main body and projecting generally inward into the bore,
    wherein the apparatus is used with a pulling device, and the main body has a first open end adapted to receive the elongated item, and a second open end, and wherein the device further comprises a cap releasably attachable to the second end that is adapted to connect the second end to the pulling device.

9. An apparatus according to claim 8, wherein the cap is threadably attachable to the body.

10. An apparatus for releasably clamping onto the end of an elongated item, comprising:
    a main body having a bore therethrough; and
    a plurality of pivoting teeth pivotedly mounted to the main body and projecting generally inward into the bore,
    wherein the teeth are each pivotably mounted by a respective pin press fit into the body, and wherein the teeth each have a rear portion that moves through at least part of the length of a respective slot in the main body during pivoting.

11. An apparatus for releasably clamping onto the end of an elongated item, comprising:
    a main body having a bore therethrough; and
    pivoting means for gripping the item pivotedly mounted to the main body and projecting generally inward into the bore, and having a plurality of pivoting teeth each pivotedly mounted to the main body by a respective hinge pin and protecting generally inward into the bore, different of the teeth being located at different angular locations from each other around the inner circumference of the body.

12. An apparatus according to claim 11, wherein the means for gripping comprises at least two teeth equally spaced in a ring, located in a plane perpendicular to a longitudinal axis of the bore.

13. An apparatus according to claim 11, wherein the elongated item is a wire or cable.

14. An apparatus for releasably clamping onto the end of an elongated item, comprising:
    a main body having a bore therethrough; and
    pivoting means for gripping the item pivotedly mounted to the main body and projecting generally inward into the bore,
    wherein the apparatus is used with a pulling device, and the main body has a first open end adapted to receive the elongated item, and a second open end, and wherein the device further comprises connecting means releasably attachable to second end for connecting the second end to the pulling device.

15. An apparatus according to claim 14, wherein the connecting means is threadably attachable to the body.

16. An apparatus for releasably clamping onto the end of an elongated item, comprising:
    a main body having a bore therethrough; and
    pivoting means for gripping the item pivotedly mounted to the main body and projecting generally inward into the bore,
    wherein the means for gripping comprises teeth pivotably mounted by pins press fit into the body, and wherein the teeth each have a rear portion that moves through at least part of the length of a slot in the main body during pivoting.

17. An apparatus according to claim 16, wherein the teeth have a sharpened tip that clamps the elongated item when the item is pulled.

18. A method for pulling an elongated item through a path, comprising the steps of:

inserting an end of the item into the bore of a body having a plurality pivoting teeth projecting generally radially inward in the bore and having the teeth each pivotely mounted to the main body by a respective hinge pin and projecting generally inward into the bore, different of the teeth being located at different angular locations from each other around the inner circumference of the body applying a pulling force to the item so that the pivoting teeth clamp on the item apply a resistive force in the pulling direction to pull the item;

maintaining the pulling force to pull the item along the path;

cutting the pulled end of the item off to form a cut end; and displacing the cut end of the item through the bore in the direction of original insertion to eject the cut end from the body.

19. A method for pulling an elongated item through a path, comprising the steps of:

inserting an end of the item into the bore of a body having pivoting teeth projecting generally radially inward in the bore.

applying a pulling force to the item so that the pivoting teeth clamp on the item apply a resistive force in the pulling direction to pull the item;

maintaining the pulling force to pull the item along the path;

cutting the pulled end of the item off to form a cut end; and displacing the cut end of the item through the bore in the direction of original insertion to eject the cut end from the body, wherein the step of pushing the cut end to eject the cut end further comprises the step of:

removing a cap from the tool body to permit ejection of the cut end.

20. A method according to claim 18, wherein the elongated item is a wire or cable.

21. A method for pulling an elongated item through a path, comprising the steps of:

inserting an end of the item into the bore of a body having a plurality of pivoting teeth projecting generally radially inward in the bore and having the teeth each pivotedly mounted to the main body by a respective hinge pin and projecting generally inward into the bore, different of the teeth being located at different angular locations from each other around the inner circumference of the body applying a pulling force to the item so that the pivoting teeth clamp on the item apply a resistive force in the pulling direction to pull the item;

maintaining the pulling force to pull the item along the path;

cutting the pulled end of the item off to form a cut end; and displacing the cut end of the item through the bore in the direction of original insertion to eject the cut end from the body;

wherein the teeth are each pivotably mounted by a respective pin press fit into the body, and wherein the teeth each have a rear portion that moves through at least part of the length of a respective slot in the main body during pivoting.

* * * * *

UNITED STATES PATENT AND TRADEMARK OFFICE
CERTIFICATE OF CORRECTION

PATENT NO. : 6,883,782 B2
DATED : April 26, 2005
INVENTOR(S) : William Matthew Ames et al.

It is certified that error appears in the above-identified patent and that said Letters Patent is hereby corrected as shown below:

Title page,
Item [75], Inventors, please correct "William Mathew Ames" to read as -- William Matthew Ames --;

Item [56], References Cited, please add -- "Description of Set Screw Clamp Pulling Grips and K-Basket Pulling Grips " (2 pages) --.

Signed and Sealed this

Twenty-eighth Day of June, 2005

JON W. DUDAS
*Director of the United States Patent and Trademark Office*